United States Patent [19]
Taylor et al.

[11] 4,433,858
[45] Feb. 28, 1984

[54] PASSIVE BELT RESPONSIVE TO SEAT OCCUPANCY

[75] Inventors: Edward F. Taylor, Farmington Hills; James C. O'Kane, Warren, both of Mich.

[73] Assignee: General Motors Corporation, Detroit, Mich.

[21] Appl. No.: 349,620

[22] Filed: Feb. 17, 1982

[51] Int. Cl.³ ............................................. B60R 21/10
[52] U.S. Cl. .................................... 280/802; 297/469
[58] Field of Search .............. 280/801, 802, 803, 804, 280/807; 297/468, 469, 481, 482

[56] References Cited

U.S. PATENT DOCUMENTS

| 3,743,046 | 7/1973 | Rothschild | 280/802 |
| 3,781,061 | 12/1973 | Walz et al. | 280/802 |
| 3,897,082 | 7/1975 | Takada et al. | 280/802 |
| 3,976,305 | 8/1976 | Fieni | 280/802 |
| 4,084,841 | 4/1978 | Hayashi et al. | 280/802 |
| 4,213,637 | 7/1980 | Mauron | 280/802 |
| 4,362,320 | 12/1982 | Ogura et al. | 280/802 |

FOREIGN PATENT DOCUMENTS

| 2302541 | 7/1974 | Fed. Rep. of Germany | 280/801 |
| 1518101 | 7/1978 | United Kingdom . | |

Primary Examiner—Joseph F. Peters, Jr.
Assistant Examiner—Ross Weaver
Attorney, Agent, or Firm—Charles E. Leahy

[57] ABSTRACT

A passive restraint belt system in which one end of an occupant restraint belt is mounted on the vehicle body inboard the seat and the other end is mounted on the vehicle door so that belt is unwound from a retractor provided at one of the belt ends when the door opens to automatically move the belt somewhat forwardly of the occupant to facilitate occupant ingress and egress. An arm is associated with the belt and is pivotally mounted inboard the occupant for pivotal movement between a position in which the arm lowers the belt to the normal restraining position across the occupant lower torso and a pivotally raised position in which the lap belt is raised above the occupant lower torso to facilitate occupant ingress and egress. The arm is suitably connected to the resilient seat bottom cushion so that the arm automatically lowers the belt to the restraining position upon depression of the resilient cushion by the weight of an occupant seated thereon and raises the belt to the raised position when the resilient cushion is restored to its normal position upon removal of the occupant weight therefrom.

1 Claim, 3 Drawing Figures

PASSIVE BELT RESPONSIVE TO SEAT OCCUPANCY

The invention relates to a passive seat belt system and, more particularly, provides a belt operating arm which is automatically raised when the occupant weight is removed from the seat and to move the belt away from the seat and is automatically lowered upon the presence of the occupant weight on the seat to move the belt to the occupant restraining position.

BACKGROUND OF THE INVENTION

It is well known to restrain an occupant in a seat by an automatically deployed shoulder belt extending diagonally across the upper torso and a lap belt extending across the lower torso.

Prior U.S. Pat. No. 3,679,229, Westrate, issued July 25, 1972, discloses such a restraint system in which the inboard ends of the lap and shoulder belts are mounted inboard the occupant seat. A control belt is suitably connected to the outboard ends of the lap and shoulder belts and is mounted on the lower rear corner of the vehicle door by a retractor. When the door is opened the control belt unwinds from the door and the generally outward and forward movement of the retractor with the door causes the control belt to move the lap and shoulder belts forwardly away from the seat to facilitate occupant ingress and egress.

It is also recognized in the prior art that the occupant ingress and egress condition of the belt can be further enhanced by providing an arm which is pivoted to the vehicle body and may be actuated to move the lap belt and/or shoulder belt even further forward than is otherwise provided by the swing geometry of the door. According to the prior art, the belt operating arms have been operated in response to movement of the door or have been operated by an electric motor or by manual effort of the seat occupant.

It would be desirable to provide a passive restraint belt system having a belt operating arm which is automatically operable in response to the presence or absence of an occupant weight upon the seat cushion to automatically move the arm and the restraint belt between the occupant restraint position and a stowed position facilitating occupant ingress and egress.

SUMMARY OF THE INVENTION

According to the invention, one end of an occupant restraint belt is mounted on the vehicle body inboard the seat and the other end is mounted on the vehicle door so that belt is unwound from a retractor provided at one of the belt ends when the door opens to automatically move the belt somewhat forwardly of the occupant to facilitate occupant ingress and egress. An arm is associated with the belt and is pivotally mounted inboard the occupant for pivotal movement between a position in which the arm lowers the belt to the normal restraining position across the occupant lower torso and a pivotally raised position in which the lap belt is raised above the occupant lower torso to facilitate occupant ingress and egress. The arm is suitably connected to the resilient seat bottom cushion so that the arm automatically lowers the belt to the restraining position upon depression of the resilient cushion by the weight of an occupant seated thereon and raises the belt to the raised position when the resilient cushion is restored to its normal position upon removal of the occupant weight therefrom.

Accordingly, the object, feature and advantage of the invention resides in the provision of a belt operating arm which is responsive to the depression of a resilient seat bottom cushion by an occupant weight thereon to automatically move the restraint belt to the occupant restraining position and automatically responsive to the restoration of the resilient cushion to its normal undepressed condition upon removal of the occupant weight therefrom to automatically move the restraint belt to a stowed position facilitating occupant ingress and egress from the vehicle.

DESCRIPTION OF THE PREFERRED EMBODIMENT

Figure 1:
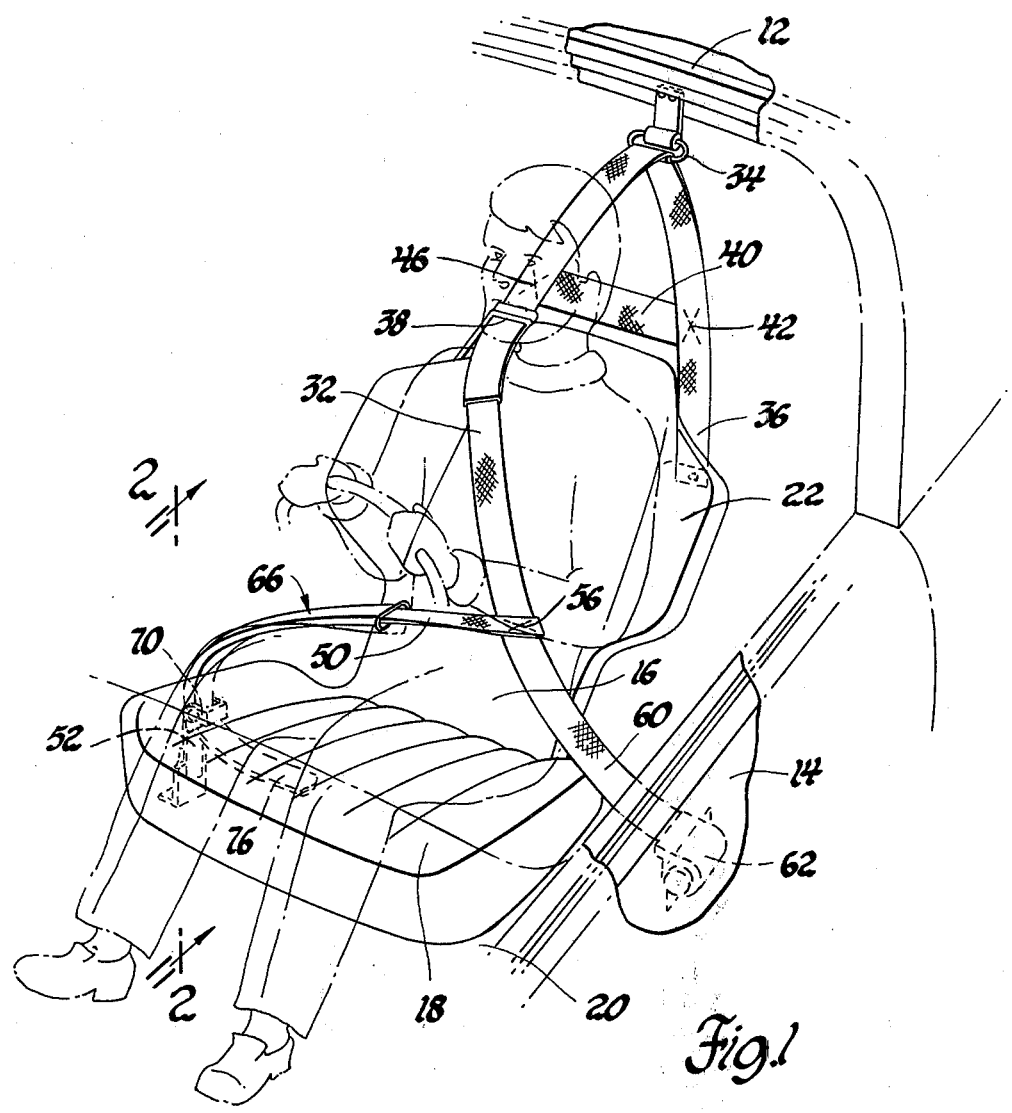
FIG. 1 is a perspective view of a motor vehicle occupant compartment showing a passive belt system operated by a control arm responsive to the presence or absence of an occupant weight on the resilient seat cushion.

Referring to FIG. 1, there is shown a vehicle body having a roof structure 12 and a door 14. The door is hingedly mounted on the vehicle body for swinging movement between a closed position shown in FIG. 1 and an open position, not shown. The vehicle body includes a seat 16 mounted within the occupant compartment. Seat 16 includes a seat bottom 18 suitably and conventionally mounted on the vehicle floor 20 and a seat back 22.

Figure 2:
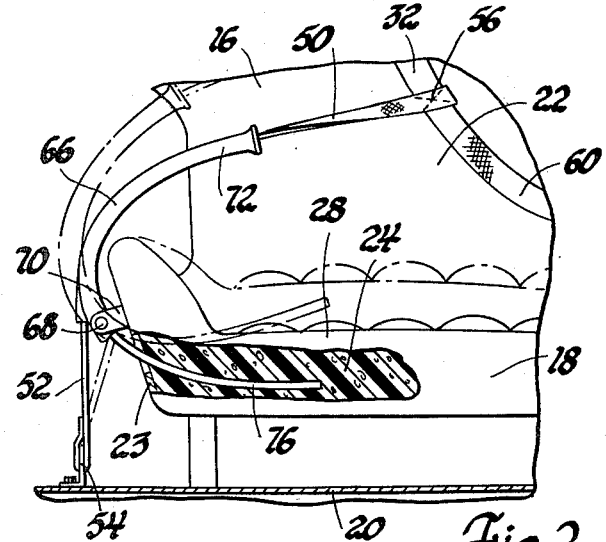
FIG. 2 is a sectional view taken in the direction of arrows 2—2 of FIG. 1.

As best seen in FIG. 2, the seat bottom 18 includes a metal or plastic shell 23 which supports a resilient foam seat bottom cushion 24. The resilient cushion 24 is concealed and protected by a cloth or vinyl seat cover 28.

Referring again to FIG. 1, it is seen that an occupant restraint system is providing for restraining the seated occupant. A shoulder belt 32 extends diagonally across the seated occupant and is mounted on the roof structure 12 by a mounting loop 34. The shoulder belt 32 extends downwardly from the mounting loop 32 in an inverted V-shape with the terminal end 36 of the belt suitably attached to the outboard edge of the seat back 22. A slide loop 38 is mounted on the inboard edge of the seat back 22 and slideably guides the shoulder belt 32. A headrest strap 40 extends between the legs of the inverted V-shape of the shoulder belt and is sewn or otherwise suitably affixed thereto at 42 and 46 so that the strap 40 defines a head restraint which limits rearward head motion. A lap belt 50 includes an inboard end 52 which is conventionally anchored on the vehicle floor 20 by anchor bracket 54. The outboard end of the lap belt 50 is sewn or otherwise suitably attached to the shoulder belt 32 at a juncture 56.

A control belt 60 is mounted on the lower rear corner of the vehicle door by a vehicle sensitive locking retractor 62. The end of the control belt 60 is suitably attached to the outboard ends of the lap shoulder belt 32 and the lap belt 50 at the juncture 56.

As seen in FIG. 1, the lengths of the shoulder belt 32 and lap belt 50 and location of the juncture 56 are situated such that when the door 14 is in a closed position and the control belt 60 is wound upon the retractor 62, the shoulder belt 32 is established in its normal diagonal restraining position and lap belt 50 is positioned across the occupant lower torso.

As best seen in FIG. 2, a control arm 66 is pivotally mounted on the seat bottom 18 by a pivot pin 68 and mounting bracket 70 for pivotal movement about a longitudinal extending axis. The control arm 66 includes a tubular sheath 72 which encloses the lap belt 50. The control arm 66 also includes an operating portion 76 which extends through an opening in the seat bottom shell 23 and is embedded within the foam cushion 24 beneath the occupant seating position.

As best seen in FIGS. 1 and 2, the resilient foam cushion 24 is compressed to the solid line indicated position of FIG. 2 by the presence of the occupant seated thereon. This compression of the seat cushion 24 forces the operating portion 76 of the control arm 66 downwardly toward the vehicle floor and pivots the tubular sheath 72 downwardly to position the lap belt 50 across the occupant lap.

When the vehicle occupant wishes to alight from the vehicle, the vehicle door 14 is unlatched and swung outwardly to the open position, not shown in the drawings. Such outward movement of the door 14 is permitted by unwinding of the control belt 60 from retractor 62. The retractor 62 is moved somewhat forwardly during the outward swinging movement of the door thereby moving the belt juncture 56 and the shoulder belt 32 and lap belt 50 somewhat forwardly of the occupant. As the occupant weight is removed from the seat 16, the resilient foam cushion 24 is restored to the phantom line indicated position of FIG. 2 and raises the operating portion 76 upwardly which pivots the control arm 66 counterclockwise and causes the tubular sheath 72 to raise the lap belt 50 further above the seat bottom to the phantom line indicated position of FIG. 2 to facilitate a subsequent reentry of the occupant into the passenger compartment.

Figure 3:
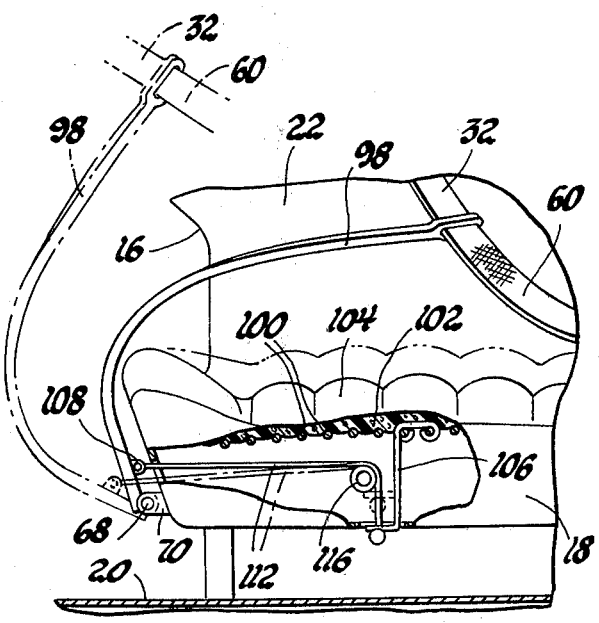
FIG. 3 is a view similar to FIG. 2 but showing a second embodiment of the invention.

Referring to FIG. 3, there is shown a second embodiment of the invention in which like elements are designated by like numerals. According to FIG. 3, the control arm and lap belt are integrally formed by the use of a suitable formed plastic or covered spring steel arm member 98 which has a stiffness sufficient to resist bending during movement between the solid line indicated restraint position and the phantom line indicated stowed position and yet is somewhat flexible under imposition of an occupant restraining load thereon during rapid vehicle deceleration. The seat bottom 18 is comprised of a conventional wire seat spring 100 which is in turn covered by a suitable layer of padding 102 and a seat cover 104. A bracket 106 is suitably attached to the seat spring 100 so that the bracket is moved up and down with the seat spring 100 in response to the presence or absence of an occupant weight on the vehicle seat bottom 18. A cable 112 extends from the bracket 106 to an eyelet 108 on the lap belt arm member 98. The cable 112 passes around a roller 116 so that the downward movement of the seat spring 100 upon imposition of an occupant weight upon the seat bottom 18 depresses the bracket 106 and tensions the cable 112 to pivot the arm member 98 to the lowered position of FIG. 3 in which the occupant is effectively restrained in the seat.

When the occupant weight is lifted from the seat bottom 18, the bracket 106 moves upwardly with the seat spring 100 and relieves the tension on the cable 112. A suitable spring, not shown, acts between the mounting bracket 70 and the arm member 98 to bias the arm member 98 to the phantom line indicated position of FIG. 3 in which the belt system is automatically moved to the unrestraining position to facilitate occupant ingress and egress.

It is understood that practice of this invention is not limited to the particular structure shown in the drawings, but rather only to the extent set forth in the appended claims.

Thus it is seen that the invention provides a belt operating arm which is responsive to the depression of a resilient seat bottom cushion by an occupant weight thereon to automatically move the restraint belt to the occupant restraining position and automatically responsive to the restoration of the resilient cushion to its normal undepressed condition upon removal of the occupant weight therefrom to automatically move the restraint belt to a stowed position facilitating occupant ingress and egress from the vehicle.

The embodiments of the invention in which an exclusive property or privilege is claimed are defined as follows:

1. A passive restraint belt system for restraining an occupant upon a resilient foam seat bottom cushion movable between a depressed state of the weight of an occupant seated thereon and an undepressed state and mounted in a motor vehicle body having a door hingedly mounted for movement between open and closed positions comprising:

a shoulder belt disposed diagonally across the seat when the door is closed to restrain the occupant upper torso;

a lap belt having an inboard end mounted on the vehicle body inboard of the seat generally adjacent the occupant hip and an outboard end attached to the shoulder belt so that the lap belt crosses the occupant lower torso when the shoulder belt is disposed in the diagonal restraining position;

a belt control arm of generally C-shape having an upper tubular sheath enclosing the lap belt and a lower operating portion integral with the tubular sheath and embedded in the resilient foam cushion; and pivot means mounting the control arm on the seat adjacent to the inboard occupant hip whereby the occupant weight depressing the resilient foam cushion depresses the operating portion and pivots the belt control arm about the pivot means to lower the lap belt to the normal restraining position when the seat is occupied, said resilient foam cushion being restored to the undepressed state upon removal of the occupant weight from the seat so that the operating portion of the control arm embedded in the resilient foam is raised to pivot the belt control arm about the pivot means and thereby raise the tubular sleeve portion so that the lap belt is raised when the seat is not occupied.

* * * * *